United States Patent
Chandranmenon et al.

(10) Patent No.: US 8,965,978 B2
(45) Date of Patent: Feb. 24, 2015

(54) METHODS AND DEVICES FOR MAINTAINING SESSIONS BASED ON PRESENCE STATUS INFORMATION

(75) Inventors: Girish P. Chandranmenon, Edison, NJ (US); Fang Hao, Morganville, NJ (US); Scott C. Miller, Freehold, NJ (US); Sarit Mukherjee, Morganville, NJ (US); Tejas Naik, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1064 days.

(21) Appl. No.: 11/393,900

(22) Filed: Mar. 31, 2006

(65) Prior Publication Data

US 2007/0233849 A1 Oct. 4, 2007

(51) Int. Cl.
- *G06F 15/16* (2006.01)
- *H04L 29/08* (2006.01)
- *H04L 12/58* (2006.01)
- *G06Q 10/10* (2012.01)

(52) U.S. Cl.
CPC .......... *H04L 67/24* (2013.01); *H04L 29/08675* (2013.01); *H04L 29/08684* (2013.01); *H04L 51/046* (2013.01); *H04L 51/043* (2013.01); *G06Q 10/107* (2013.01); *H04L 67/306* (2013.01); *H04L 67/327* (2013.01)
USPC ............................ 709/205; 709/207; 709/227

(58) Field of Classification Search
CPC .... G06Q 10/107; H04L 67/24; H04L 67/306; H04L 67/327; H04L 12/58; H04L 12/581; H04L 12/5815; H04L 12/582; H04L 29/08684; H04L 29/08675; H04L 51/04; H04L 51/043; H04L 51/046

USPC .................................................. 709/207, 227
See application file for complete search history.

(56) References Cited

U.S. PATENT DOCUMENTS

| | | | |
|---|---|---|---|
| 6,006,090 A | 12/1999 | Coleman et al. | |
| 6,147,986 A | 11/2000 | Orsic | |
| 6,167,513 A | 12/2000 | Inoue et al. | |
| 6,170,057 B1 | 1/2001 | Inoue et al. | |
| 6,230,004 B1 | 5/2001 | Hall et al. | |
| 6,249,818 B1 | 6/2001 | Sharma | |
| 6,315,668 B1 * | 11/2001 | Metke et al. | 463/42 |
| 6,352,479 B1 * | 3/2002 | Sparks, II | 463/42 |
| 6,546,425 B1 | 4/2003 | Hanson et al. | |
| 6,699,125 B2 * | 3/2004 | Kirmse et al. | 463/42 |
| 7,240,093 B1 * | 7/2007 | Danieli et al. | 709/205 |
| 7,288,027 B2 * | 10/2007 | Overton | 463/42 |
| 7,464,139 B2 * | 12/2008 | Malik | 709/206 |
| 2001/0047276 A1 | 11/2001 | Eisenhart | |
| 2004/0162881 A1 * | 8/2004 | Digate et al. | 709/206 |
| 2005/0071433 A1 * | 3/2005 | Shah | 709/207 |
| 2005/0113123 A1 | 5/2005 | Torvinen | |
| 2005/0239550 A1 * | 10/2005 | Hardisty et al. | 463/42 |

(Continued)

FOREIGN PATENT DOCUMENTS

| | | |
|---|---|---|
| JP | 2001243153 | 9/2001 |
| WO | WO 0223362 | 3/2002 |
| WO | WO 2004/034719 | 4/2004 |

*Primary Examiner* — Patrice Winder
(74) *Attorney, Agent, or Firm* — Capitol Patent & Trademark Law Firm, PLLC

(57) ABSTRACT

Sessions, such as on-line gaming sessions, are maintained by proxy agents on behalf of users even when the users are inactive. The agents, along with other components, form a novel "always-on" architecture that greatly reduces the time it takes to initiate and carry out sessions.

22 Claims, 5 Drawing Sheets

(56) References Cited

U.S. PATENT DOCUMENTS

| | | |
|---|---|---|
| 2006/0015645 A1 | 1/2006 | Ocko et al. |
| 2006/0121990 A1* | 6/2006 | O'Kelley et al. ............. 463/42 |
| 2006/0247055 A1* | 11/2006 | O'Kelley et al. ............. 463/42 |
| 2012/0283023 A1* | 11/2012 | O'Kelley et al. ............. 463/42 |

\* cited by examiner

METHODS AND DEVICES FOR MAINTAINING SESSIONS BASED ON PRESENCE STATUS INFORMATION

BACKGROUND OF THE INVENTION

There is presently an explosion in the number of people that are involved in playing on-line games over the Internet and other networks. These games allow for interactive play between one or more persons within a game. In parallel with this development has come an increase in the amount of signaling and information messages which must be sent over a network in order to enable interactive, on-line gaming to grow. Some of the changes which service providers of such networks face include: (a) how to make on-line gaming more personalized; (b) how to reduce any delays caused by the network; (c) how to increase the interactive nature of such games; and (d) how to use their existing networks to achieve these goals without greatly increasing their costs.

As an example of (a), it is desirable to provide a user who wishes to play an on-line game with the means of knowing when his or her best friends (sometimes referred to as "buddies") are also on-line and available to play a game. Similarly, if a buddy is on-line and available to play a game it is desirable to be able to initiate such a game very quickly. In so doing, it is desirable to enable a service provider to offer these features without the need to spend a lot of money upgrading or changing their existing network.

SUMMARY OF THE INVENTION

To achieve the desires stated above and others the present invention provides novel architectures that allow users to more easily and quickly communicate with one another to carry out all kinds of communication-related sessions, including on-line gaming. In one embodiment of the invention, an "always-on" architecture includes an "always-on" client that initiates an "always-on" session with an "always-on" proxy agent Thereafter, the agent is operable to maintain a session on behalf of the client even if the client becomes inactive (e.g, a device that includes the client is no longer powered-on, etc.). Even though the client may be inactive, the agent may screen or otherwise filter information messages intended for the client. When the client finally becomes active again the agent may forward screened messages to the client. Because the agent acts on behalf of the client, communication sessions can be initiated and resumed quickly.

To ensure that substantially little airlink time is used, in a further embodiment of the invention the client and agent may exchange messages formatted as short binary messages or in another format that helps conserve airlink and/or bandwidth.

The novel architecture my also include an "always-on lobby" as well. In one embodiment of the invention a lobby may be operable to form and maintain user groups, where each group may be associated with a particular type of application (e.g., on-line game).

Each of the three components of the architecture, namely the client, agent and lobby may take the form of one or more firmware or software applications that are stored on a computer readable medium, such as a compact disk, hard drive, memory, processor or some combination of the just mentioned devices. These devices in turn may be incorporated within a larger wired or wireless device, such as a telephone, personal digital assistant (PDA), gaming device, computer (desk-top or laptop), server, or some kind of management device, etc.

DETAILED DESCRIPTION OF THE INVENTION WITH EXAMPLES

Figure 1:
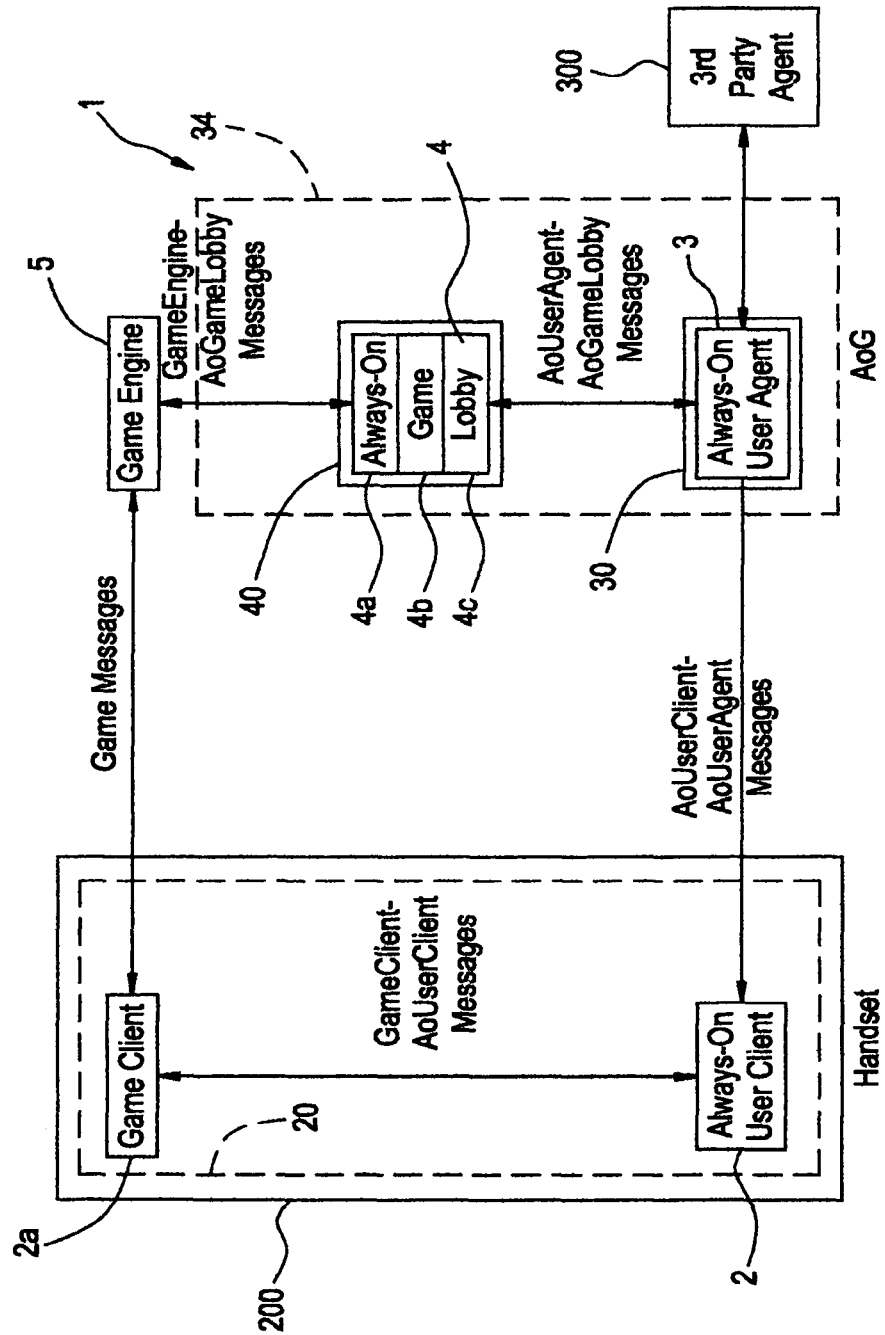
FIG. 1 depicts a block diagram of an architecture in accordance with embodiments of the present invention.
Figure 2:
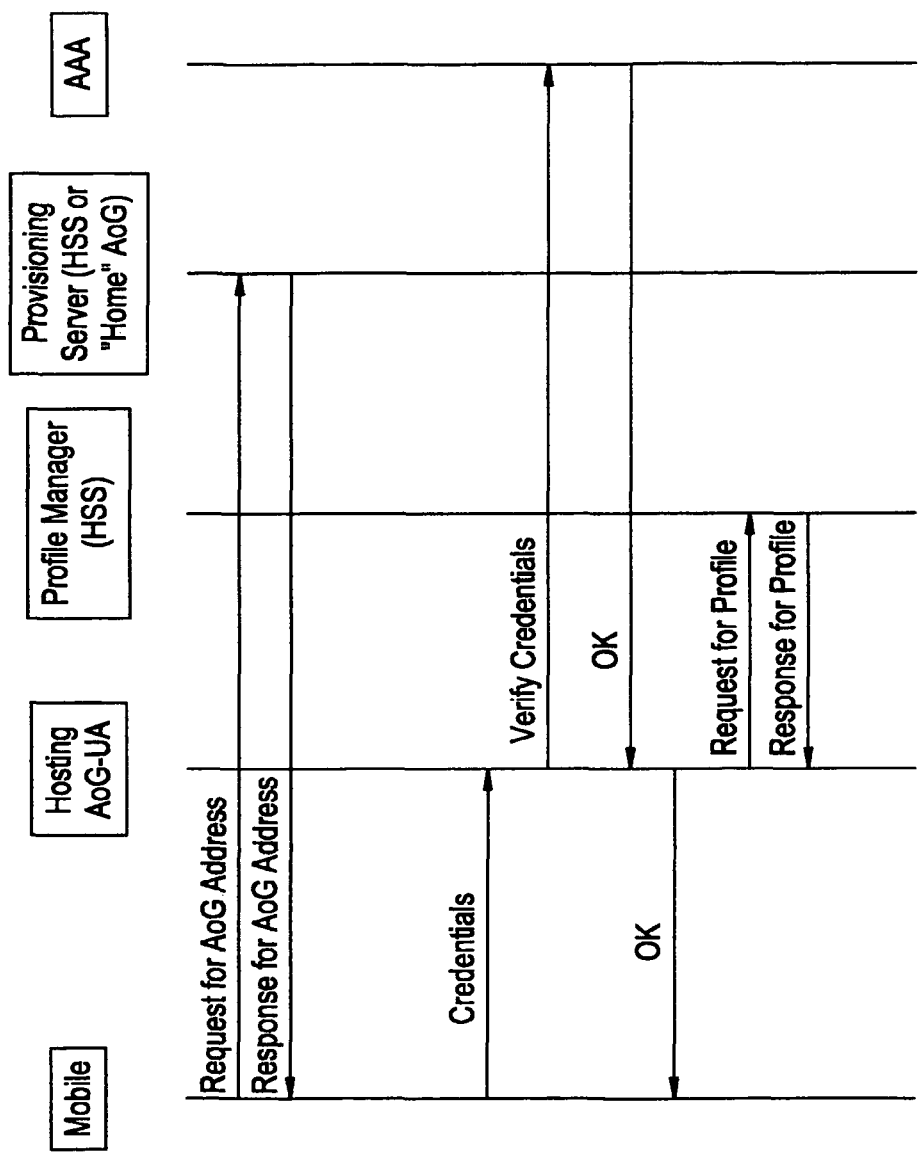
FIG. 2 depicts messaging and signaling events which occur during the authentication and authorization of a user with a network according to embodiments of the present invention.
Figure 3:
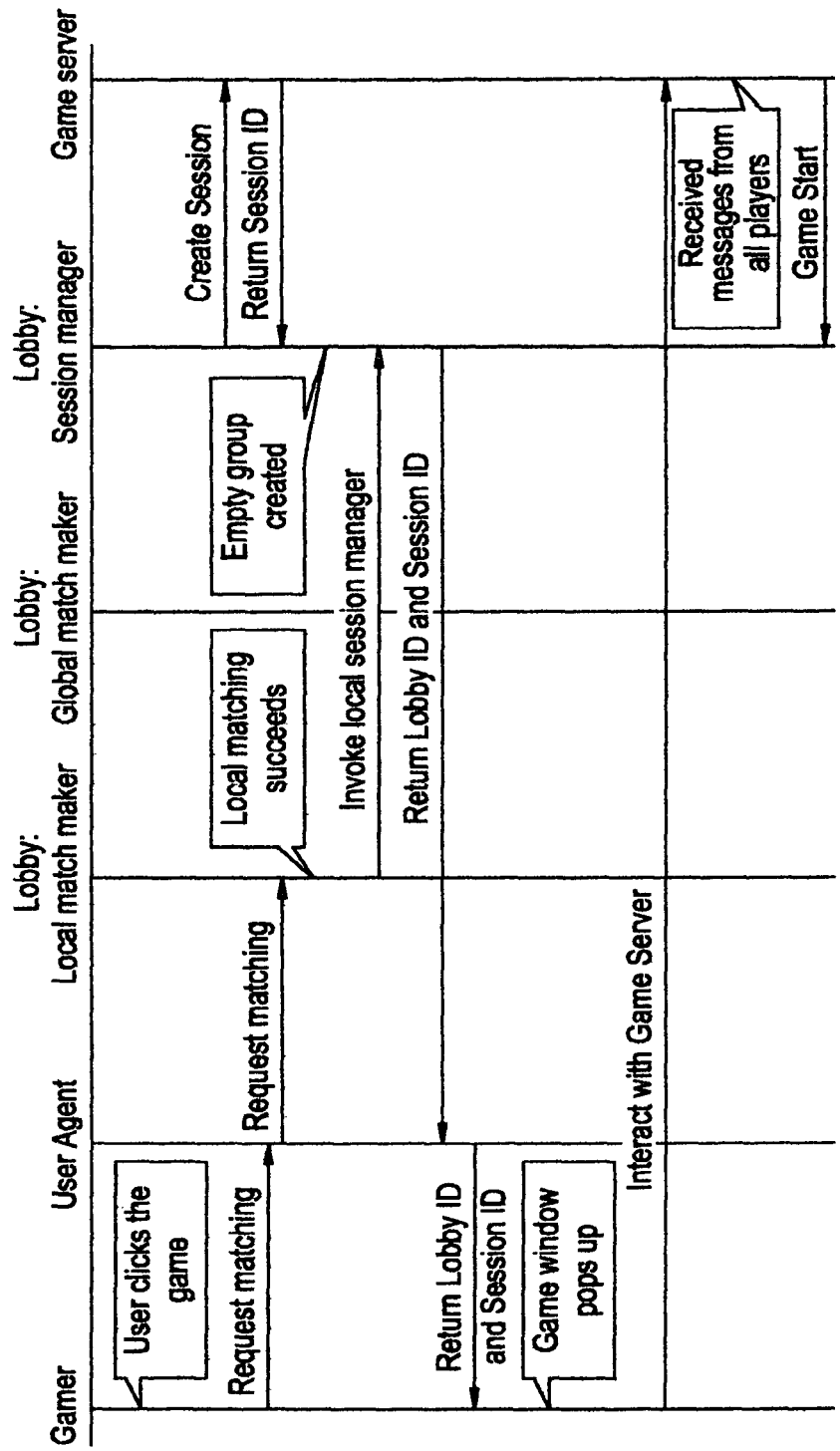
FIGS. 3 and 4 depict messaging and signaling flows between a user and anonymous players interested in playing a game using local matching according to embodiments of the present invention.
Figure 4:
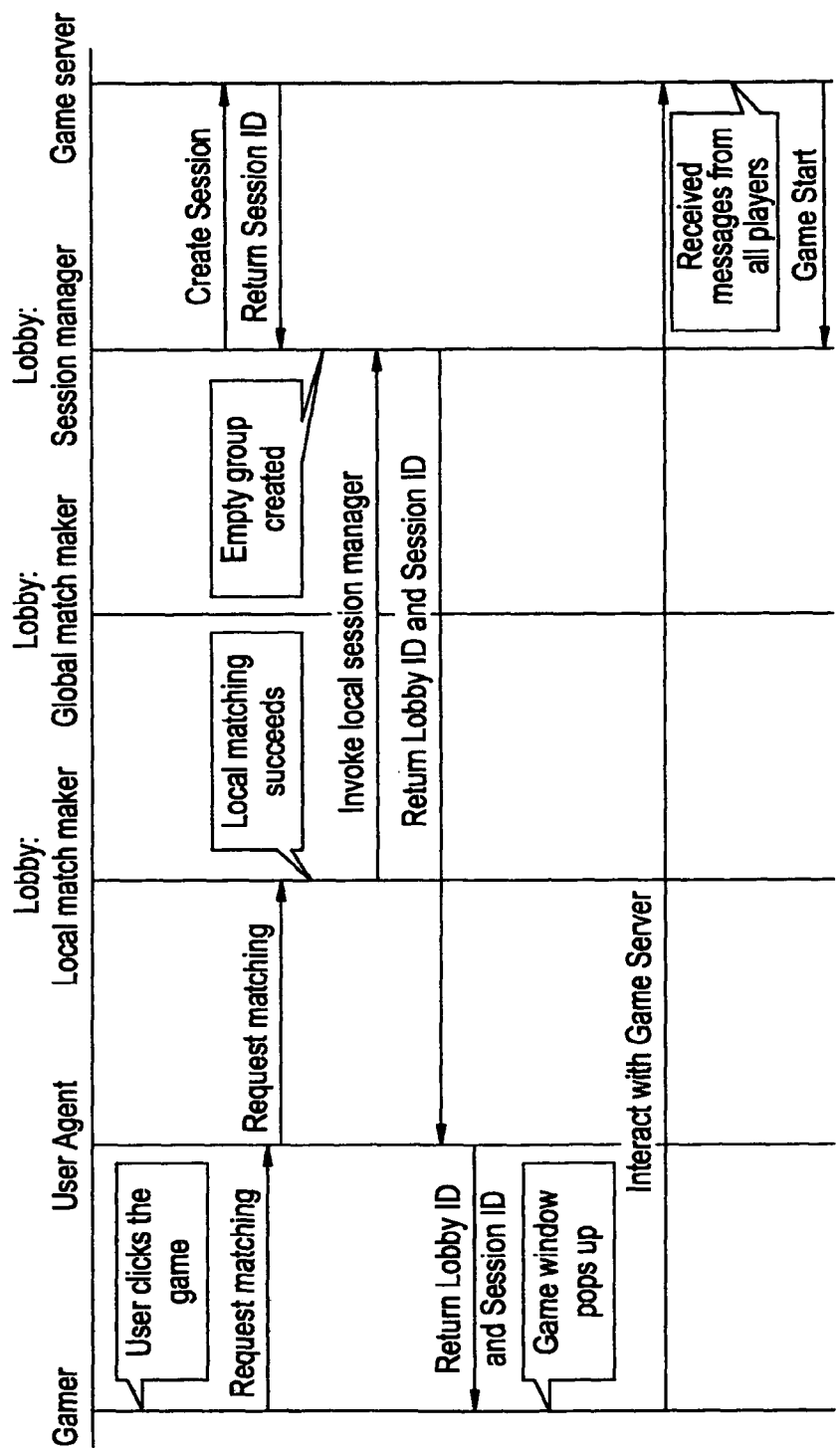
Figure 5:
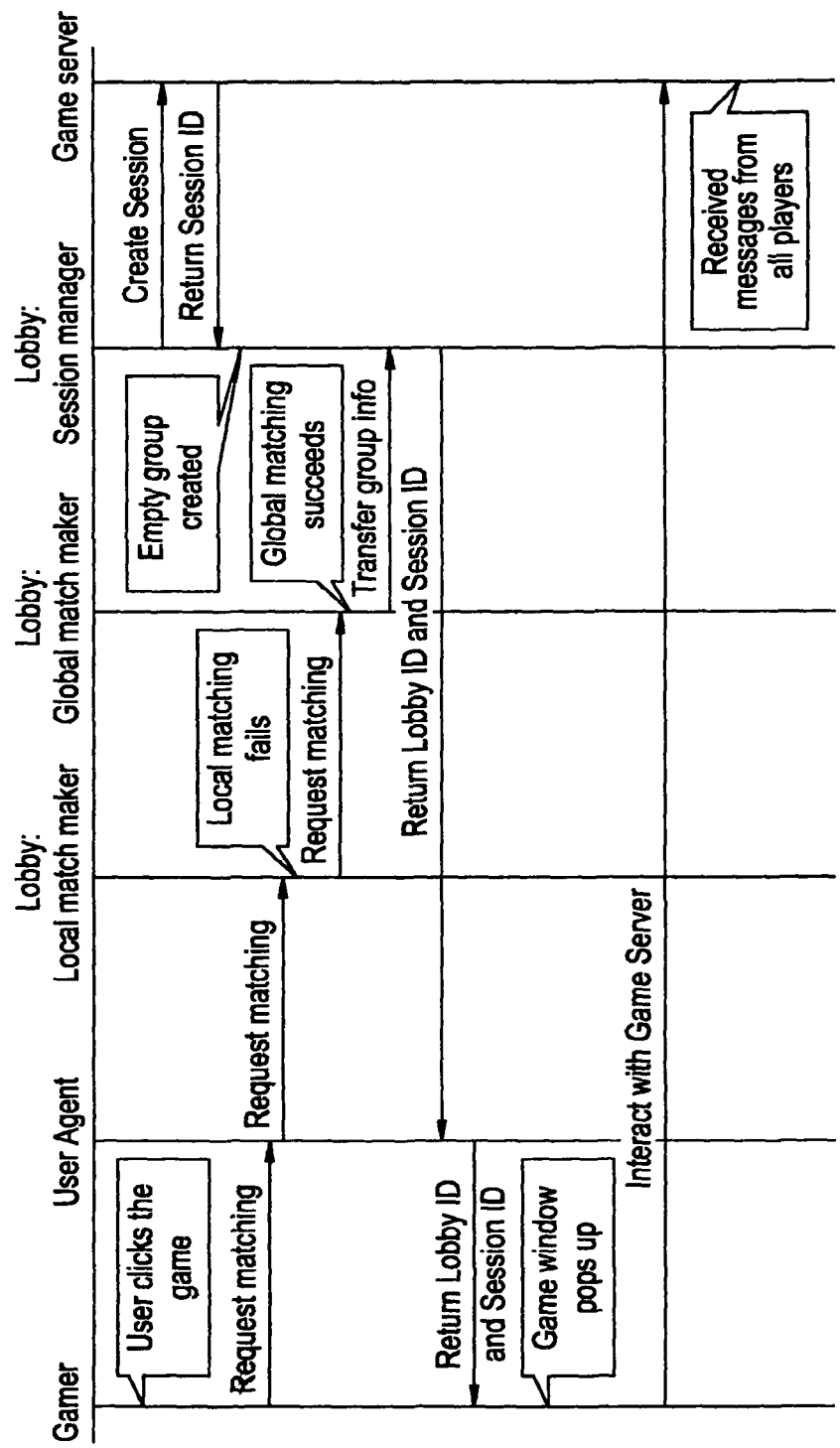
FIG. 5 depicts messaging and signaling flows to initiate a game using global matching according to embodiments of the present invention.

Referring now to FIG. 1 there is shown an architecture 1 in accordance with one embodiment of the present invention. This architecture 1 may be used by a service provider to deliver one or more services in a manner that is faster than previously thought possible while requiring a minimal amount of changes or upgrades to the provider's network. As shown, the architecture 1 comprises at least one always on client 2, at least one always on proxy agent 3, and at least one always on lobby 4. Also shown are at least one other applications client 2a (e.g., gaming client), applications engine 5 (e.g., gaming engine) and one or more optional third party agents, such as agent 300. The client 2 and applications client 2a may comprise one or more software or firmware programs/applications that may be co-located and stored on a single computer readable medium 20 of some sort which may be, in turn, embedded within a larger device 200, such as a wired or wireless telephone, PDA, computer, gaming device, or a device which combines one or more functions (e.g., email and voice messaging), etc. Alternatively, the client 2 and applications client 2a may be stored on more than one medium or stored on separate mediums. Likewise, the agent 3 and lobby 4 may also comprise one or more applications and may also be stored on some kind of computer readable medium 30, 40, respectively, that are also part of one or more larger devices, such as a server 34 or the like. Though shown as one component 34, it should be understood that the agent 3 and lobby 4 may be separate components/applications and need not be co-located. When stored on a computer readable medium, the features and functions of components 2, 2a, 3, 4 and 5 may be carried out and/or controlled by code making up a respective application or the like.

While the discussion which follows will focus on on-line gaming, it should be understood that the "always-on" architectures provided by the present invention may be used for any number of services; that is, they are not limited to just gaming services, applications or activities.

In addition, it should be understood that a service provider may chose to implement an always-on architecture provided by the present invention in any number of ways. For example, an architecture (such as architecture 1) may be implemented by a service provider such that it is "underneath" another communication application (e.g., gaming application). That is to say any third party communication applications the service provider has available may lay on top of the always-on architecture.

We will discuss each of elements of architecture 1 in the following order: the client 2; followed by the agent 3, followed by the lobby 4.

In one embodiment of the present invention, the client 2 may comprise a so called "thin component" that runs on a larger device such as a wireless telephone, PDA, laptop computer, a device which combines more than one function (email and voice), or the like.

When a device 200 which incorporates the client 2 (and/or applications client 2a) powers on, the client 2 is operable to execute an initialization process. During this time period, the client 2 communicates with a provisioning server or the like (not shown in FIG. 1) in order to receive the identity of the proxy agent 3 that has been provisioned to (i.e., assigned to) the client 2. In accordance with one embodiment of the invention, the provisioning server may select an agent that is close to the client 2.

In one embodiment of the present invention, to begin a session, whether a gaming session or another type of communication session, the client 2 is operable to forward a registration instruction to the so-identified proxy agent 3 in order to begin a synchronization process that establishes an initial session between the client 2 and identified agent 3. During this synchronization process the client 2 and agent 3 exchange signaling messages with one another that may be formatted, for example, as short binary messages. Because the messages are so formatted, each exchange requires substantially little airlink time.

After the client 2 and agent 3 have been synchronized, the agent 3 may be further operable to forward information messages to the client 2. These messages may be used by the client 2 to generate one or more menus that may be displayed on a display (not shown in FIG. 1) of the device 200. The information messages may also be formatted as short binary messages. Each menu may in turn include one or more icons or indicators (e.g., soft or hard-keys) representing a number of values. For example, one icon may represent the games, applications or activities a user of the device 200 is involved in most often. Another icon may represent the individuals (i.e., "buddies") that the user communicates with (i.e., plays games with) most often. Still another icon may represent those individuals who are presently available and/or desirable to communicate with the user. The icons just mentioned are just a few of the many icons and/or indicators that may be generated and displayed on a display associated with the device 200. A more detailed discussion of the types of menus and icons that may be displayed on a device like device 200 may be found in co-pending U.S. patent application Ser. No. 11/393,886, incorporated herein in full as if set forth herein in full.

The initialization, synchronization, signaling and information messages which are exchanged between the client 2 and agent 3 may be sent wirelessly or via a wired communications channel. Similarly, each of the components shown in FIG. 1 may be wired or wireless devices.

As will be discussed in more detail below, the types of information messages that the agent 3 may send to the client 2 may vary depending on the functions being carried out by the agent 3. For example, the agent may be operable to monitor the communication habits of a user of device 200. Based on information that the agent 3 collects during this monitoring, the agent may process, analyze, and update (collectively referred to as "process") this information to identify patterns. Based on these patterns the agent may forward messages on to the client 2 in order to update one or more icons or menus, etc. that the user accesses in order to carry out an activity/application. In addition to monitoring the habits of a user, the agent 3 may also be operable to monitor the "presence status" of the user of the device 200. By presence status is meant, for example, whether or not the device 200 is powered up, or whether the user is actively using the device 200 (e.g., depressing soft keys or selecting icons).

In further embodiments of the invention, the agent 3 may also monitor the presence status of other users, such as the user of the device which is associated with agent 300, and pass this information on to the device 200 via client 2. In yet additional embodiments of the invention the agent 3 may act as a proxy on behalf of the device 200 and client 2 even when the device 200 is inactive. Before going further, when we refer to the operation of device 200 it should be understood that many of the operations are carried out and/or controlled by the client application/component 2.

Backtracking somewhat, suppose after the client 2 and agent 3 are synchronized the agent 3 forwards information messages to the client 2 concerning those games that are available to be played by the user of device 200 and those buddies presently available to play such a game. These messages are used to create one or more icons, such as an icon that combines the games available and buddies available information into one "buddies presently available to play a game" icon. This icon intuitively presents information to the user of device 200 without requiring the user to "drill down" or navigate as the case may be through multiple levels of menus. Suppose further that sometime after the icon is displayed the user depresses or otherwise selects this icon (or key) in order to invoke or begin a game with those buddies who are presently available. Upon the depression of a key or selection of an icon a signal is sent to the agent 3 from the client 2 that informs the agent 3 of the user's request to play a game (or, in general, to become active in an application associated with the icon selected by the user).

Before going further, it should be understood that, in an alternative embodiment of the invention, the agent 3 forwards information messages to the client 2 only after receiving a signal indicating that the user has selected an icon or depressed a key. When a user selects a key, for example, this ensures that the user and device 200 are in an active state. Only when a user or device 200 is in an active state is it really necessary for the agent 3 to forward information messages to, for example, update the icons, etc., within menus displayed on the device 200. That is, if the user is inactive (e.g., inattentive, not using the display or keyboard of device 200, etc.) any updates sent by the agent 3 would not be seen by the user anyway. Not only would the information be ignored, but valuable airlink time would have been used unnecessarily. Thus, by waiting until the user or device 200 are in an active state, valuable airlink time is conserved.

Continuing with the example above, upon receipt of a signal indicating the user has selected an icon to begin playing a game with the buddies that are presently available to play a game, the agent 3 is operable to process this signal and, if appropriate, forward a request signal on to the agent(s) associated with each of the buddies. For example, such a request may be forwarded to third party agent 300. Third party agent 300 may respond in a number of ways. One response may indicate that its associated user (via an associated client) is not only available, but desires to play a game with the user of device 200. Other responses may indicate that the third party user does not desire to play a game, etc. In a similar fashion, the agent 3 may forward such requests to each third party agent associated with each buddy or individual that is associated with the icon selected by the user of device 200. Upon receiving the responses from all of the third party agents, the agent 3 is operable to determine which individuals have agreed to play a game with the user of device 200 (or, more generally, which individuals have agreed to communicate or carry out an activity or application with the user).

In a further embodiment of the invention, the agent 3 may be operable to forward those identities of third party users that have agreed to play a game with the user of device 200 to the lobby 4. Upon receipt of these identities, the lobby 4 is operable to generate a "group" associated with the game or application/activity. Once a group is formed the lobby 4 is further operable to forward a request on to the game server 5 in order to obtain game and server specific information necessary to initiate the game requested by the user of device 200 (e.g., game server identity, session ID, etc. . . . ).

Before we discuss the operation of the lobby 4, however, more can be said about the operation of the agent 3. In the example given above it was assumed that the agent 3 was not aware of the presence status or preferences of the third party users associated with the request to play a game. This need not be the case. In yet additional embodiments of the invention, the agent 3 (in fact each agent) may be operable to receive the presence status, preferences, and other information related to other users. This information can be stored or cached within the agent 3 or delivered in a "just in time" manner (e.g., on-demand). With this information in hand, the agent 3 may first process this information and determine whether a particular third party user is in fact presently available to play a game before forwarding a request signal on to the agent of such a third party user.

This ability to store the presence status and preferences of other users may greatly reduce the time required to form a group interested in playing a game as well as reduce the amount of airlink time that is used. No longer must the user of device 200 wait for each third party user to respond to a request. Instead, the agent 3 may have knowledge of a third party user's presence status (e.g., active/inactive) at the time the agent 3 receives a signal from client 2 to initiate a game. If such is the case, then the agent 3 may take alternative steps to inform the lobby 4 which of the invited third party users are actually available to play a game. For example, the agent 3 may compare the request from client 2 with the presence status of all third party users in its memory and, thereafter, only provide the lobby 4 with the identities of those third party uses whose presence status indicates they are truly presently available to play a game.

In yet additional embodiments of the invention, the agent 3 is continuously collecting the presence status and preferences of both the user of device 200 and one or more third party users. This information may be collected from third party agents, the third party users, or from other sources, such as a presence server.

Throughout this discussion the word "session" is used. It should be understood that by session is meant the time period which elapses between the time an application, feature or function is selected by, for example, accessing an icon, key, etc. . . . on device 200 or agent 3 and the time when the user/agent decides to terminate the application, feature or function. Many times the words "session" and "application" will be used interchangeably. In the context of our discussion this is acceptable in order to avoid making the explanations herein overly complicated. That said, it should be understood that a session is a time period while an application is stored on a component in network 1. With this in mind, the present invention provides for alternative embodiments where the agent 3 acts as a proxy agent on behalf of the client 2 and its associated user.

Because the agent 3 may collect information regarding the communication habits (e.g., gaming activity), presence status and preferences (to name just a few examples of such collected information) associated with the user of device 200 and other users, the agent 3 is prepared to act on the user's behalf without necessarily communicating with the user. This ability makes it possible to reduce the amount of signaling and other messages that are exchanged between the agent 3 and client 2 which in turn, conserves valuable airlink time.

Backtracking yet again, in a further embodiment of the invention, prior to communicating with a client 2 the agent 3 is initially operable to register its identity with a provisioning server (not shown in FIG. 1). In response, the server assigns the agent 3 to a client, in this case client 2. The provisioning server keeps track of the client/agent assignments among other things. Upon registering with the server and being assigned a client, the agent 3 is operable to receive stored information associated with the user of client 2 and device 200 (e.g., a profile of the user's communication activity, preferences, habits, patterns of usage, etc.). Because this information is stored by the server, the agent which serves the client 2 may be changed as needed from time to time. It should be noted, however, that during any given instance of time, a single agent is assigned to a single client.

In accordance with the present invention, the agent 3 may act as a proxy for the client 2 and its associated user in many different instances, only a few of which will be discussed herein. Any attempt to provide an exhaustive list of instances would require a substantially longer discussion and is not necessary for an understanding of the present invention. We have mentioned above an example of one type of session where the agent 3 acts as a proxy, namely, the ability of an agent to determine which third party users are presently available to play a game with the user without communicating with the client 2 or device 200. In general, the agent 3 may be operable to carry out many of the features and functions of the client 2 and device 200 without first communicating with either. For example, the agent 3 may be programmed or otherwise designed to act as a proxied receiver or transmitter of information messages to/from other third party users. To the extent the agent 3 has been given the capability of device 200, and may act on its behalf without exchanging signaling messages, etc., with the device, this may greatly conserve airlink time and speed up communications between the user of device 200 and another third party user. No longer must the third party wait for the exchange of signaling messages followed by information messages to receive a response back from the user. Instead, such a response may be generated by the agent 3.

Up until now our discussion has assumed that the client 2, device 200 and/or user is active (e.g., accessing the display of device 200, etc. . . . ) In further embodiments of the invention the agent 3 may act as a proxy agent even when the client 2, device 200 and/or its user are inactive.

For example, when the device 200 powers down the agent 3 is nonetheless operable to maintain a previously initiated session. Such a session may, for example, involve one or more other third party devices/users. During the time period when the device 200 is inactive the agent 3 may be operable to carry out many of the functions and features of device 200 on its behalf (and its associated user of course) as well as carry out its own presence status monitoring discussed above and below. In alternative embodiments of the invention, the agent 3 may also be configured (e.g., programmed, or designed) to act as a proxy for the user in a game session the user had previously been involved in. Those knowledgeable in the art of gaming may refer to this capability as "roboting".

Another example of acting as a proxy agent is as follows. Suppose information messages intended for the user of device 200 are sent while the device 200 is powered down. Instead of needlessly attempting to forward these on to the device 200 by first sending a signaling message to determine whether the device 200 is powered on (which is how many existing techniques work), the agent 3 is operable to intercept, filter or otherwise screen (collectively referred to as "screen") these messages. Because the agent 3 is capable of monitoring the presence status of device 200 etc, it knows in advance whether or not the device 200 is active (e.g., powered up/on). Thus, upon receipt of a message intended for the user of device 200 the agent 3 may be operable to forward the message on to the device 200 only if the device 200 or user is active, for example. This ability to act on behalf of the user of device 200 while the user is inactive combined with the other features/functions of the agent 3 discussed above may greatly reduce the time it takes to respond to a message from a third party, not to mention that this may also greatly conserve the airlink time or bandwidth capacity of a service provider's network.

Because it is operable to screen messages, agent 3 may also be operable to act as a spam filter, screening out those messages the agent 3 determines to be spam or, alternatively, malicious messages.

In addition to screening messages during a proxied session, the agent 3 may also store messages intended for the device 200. In accordance with yet another embodiment of the present invention, once the device 2 powers up or the user otherwise becomes active (e.g., makes a selection using the display or keyboard associated with device 200) the agent 3 may be operable to forward messages the agent 3 has stored or cached on behalf of the device 200 while the device or user was inactive.

In addition to forwarding stored messages, once the device 200 becomes active again the agent 3 may be operable to forward information to update (or create) one or more of the keys, icons or menus displayed on, or otherwise associated with a keyboard, of device 200. For example, the agent 3 may forward updated presence status information for a user's buddies or for anonymous individuals that are presently available to play a game with the user of device 200. The forwarded information may also include those games or applications that are now available to be accessed by the user. Though the device 200 may be operable to create and forward the icons, menus, etc., itself, alternatively, the agent 3 may be operable to create formatted messages that can then be used by the device 200 to create or update an icon, key, menu without much processing by the device 200.

With respect to the roboting features provided by the present invention, the agent 3 may be operable to carry out a set of instructions on behalf of the user of device 200 that were provided by the user of device 200 prior to its becoming inactive, for example.

In one of the examples discussed above, the agent 3 forwards the lobby 4 the identities of those third party users who are presently available to play a game with the user of device 200. We now continue with this example in order to point out some of the features and functions of lobbies provided by the present invention, such as lobby 4.

In general, lobbies provided by the present invention carry out: (a) group formation and management, and (b) matchmaking activities associated with sessions. A lobby, such as lobby 4, may be operable to maintain a plurality of groups. For example, the lobby 4 may form and manage groups that contain: (1) those users who are interested in playing a particular game or games; (2) those users who have played a particular game or games; and (3) those users who have the same skill level in a particular game or games, to give just a few examples of the types of groups that can be created and managed by the lobby 4.

In a further embodiment of the invention the lobby 4 may use its matchmaking functions to determine whether the third party users, whose identities it has received from agent 3, should indeed be made a part of the same group. Perhaps the user of device 200 has mistakenly requested someone who does not have the same skill level as the user to join the game. The lobby 4 may be operable to compare the skill level of each identified user with the skill level contained in the request to ensure this requirement is met. The lobby 4 may carry out this comparison by comparing skill levels it has stored with the skill level in the request. This comparison is just one example of the matchmaking capabilities of the lobby 4.

Assuming, for the sake of the example we began earlier, that upon receiving each identity of the invited third party users the lobby 4 determines through its matchmaking functions that each user is qualified to play a game or otherwise communicate with the user of device 200. Thereafter, the lobby 4 is operable to form a group that consists of all of the identified third party users along with the user of device 200. Having now formed and stored a group, the lobby is further operable to invoke its management functions in order to send a group formation indication to the agent 3 which is relayed on to the client 2. In this manner, the user of device 200 may receive an icon, key or some other kind of indication/indicator that a group has been formed to play a game, for example.

In addition to interfacing with the agent 3, the lobby 4 may also invoke its management functions to interface with an applications server, such as game engine/server 5, and other lobbies (not shown in FIG. 1). The lobby 4 may interface with the server 5 in order to request, and receive, information and signals (e.g., a game session ID) related to initiating, maintaining and terminating an application/session that involves the server 5, such as a game. The lobby 4 may forward the application/session information to the agent 3 which relays this information on to the user of device 200 as well as on to the agents associated with the third party users that are included in the group formed by the lobby 4. Alternatively, if a third party user and/or her agent are not associated with the lobby 4, the lobby 4 may forward the application/session information on to the lobby that is associated with the third party user and/or her agent so that the third party user will be able to participate in the game or other application/activity.

Upon receiving the application/session information, the client 2 may be operable to communicate with the applications client 2a in order to request that the client 2a create a link with the server 5 to begin the application (e.g., begin the game). In a similar manner, each third party client that receives the application/session information invokes its own applications client to contact the server 5 (or a server associated with a game session) in order to begin participating in the game.

As indicated earlier on, the lobby 4 (as well as the client 2, applications client 2a and agents 3 and 300) may comprise one or more software or firmware applications that are stored on some sort of computer readable medium using known methods, including by downloading components on to a medium. In alternative embodiments of the invention, the matchmaking and management functions, as well as other functions, of the lobby 4 may be separated into different sub-components/applications. For example, the lobby 4 may comprise: (i) a session management sub-component 4a; (ii) a communications server sub-component 4b; and (iii) a comparison/matchmaking sub-component 4c.

In one embodiment of the present invention, the session management sub-component 4a may be operable to provide users with information concerning a given application/session, such as when a session has started or can begin (e.g., the game session ID mentioned beforehand). The session manager may also be operable to govern the participation of users in a game by deleting existing users, or adding new ones, when appropriate to a game/activity/application.

In accordance with the present invention, the communication server sub-component 4b may be operable to relay information messages between one or more clients/users in a group that are participating in, or who had been participating, in a session. These messages may comprise voice, text, video and/or multimedia content for example.

Again, though the primary type of application/session discussed herein is a game, it should be understood that many different types of applications/sessions, such as voice conferencing or the like, may be handled by the techniques of the present invention.

The last sub-component mentioned above was the matchmaking sub-component 4c, whose functions we have discussed before. One other function that may be carried out by this sub-component is the addition/deletion of one or more third party users from a session based on whether or not each user is active or inactive (i.e., their presence status). This helps those still active informed of the status of all the other users, for example.

For the most part the examples above focus on third party users that are known to the user of device 200. It should be understood that the features and functions of the agent 3, lobby 4 and client 2 may also be used to invite, identify, qualify or otherwise add/delete third party users that are unknown to the user of device 200 (though they may be known to the lobby 4, for example). These users may be referred to as anonymous users.

For example, the client 2 may send a request to the agent 3 to invite any user that has a certain skill level to join a game without providing the agent 3 with the identity of the invitees. The agent 3 may refer such an invitation to the lobby 4 which may consult its stored groups or user profiles to identify qualified anonymous users. Once one or more users are identified by the lobby 4 the lobby may form a group consisting of one or more of the identified individuals and the user of device 200 who initiated the request. The lobby 4 may select the individuals in any number of ways, including randomly, or according to some order.

It may occur that the lobby 4 cannot form a group that meets the requirements of a request initiated by the user of device 200. When this occurs the local lobby 4 ("local" because it is associated with agent 3 and client 2) may forward the requirements of the request on to one or more, third party or remote global lobbies (not shown in FIG. 1). Each global lobby then attempts to identify users (and their profiles) that have attributes which satisfy the requirements of the request. Each global lobby has knowledge of many more users and their preferences, etc., that may satisfy the request than the local lobby 4. An identification of some sort of each user is sent to the locally lobby 4 by the respective global lobby. Thereafter, the local lobby 4 may form a group.

For the sake of completeness the reader may wish to consult FIG. 2 through 5 which depict messaging and signaling flows that occur between the components shown in FIG. 1 according to the embodiments of the present invention.

Although we will not discuss the signaling and messages flows depicted in these figures in detail, it should be understood that these flows are just some of the flows between components of the present invention. Further details concerning the messages exchanged between the components shown in FIG. 1, their formats and content may be found in co-pending U.S. patent application Ser. No. 11/393,885, incorporated herein in full as if set forth in full herein.

The above discussion has attempted to set forth some examples of the features and functions of the present invention. The true scope of the present invention, however, is set forth in the claims that follow.

We claim:

1. A method for forming one or more groups associated with one or more online gaining sessions comprising:
receiving one or more identities of one or more third party users;
determining the availability of the identified third party users;
comparing profiles of the identified and available third party users, with attributes of a request to initiate an online gaining session of a game by a user, to determine the gaining skill level of the third party users;
forming a gaining group containing those third party users that are not currently involved in a gaining session of the game, and have the substantially same gaining skill level as that required by the request from the compared, identified and available users along with the user that initiated the request;
further comprising:
initiating the online gaining session of the game for the formed gaining group;
forwarding requirements of the request on to a third party lobby to identify the third party users that satisfy the request; and
receiving an identification of each third party user that satisfies the request.

2. The method as in claim 1 further comprising:
forming the gaining group containing those third party users that are not currently involved in a gaining session of the game, and
satisfy the request along with the user that initiated the request.

3. The method as in claim 1 further comprising: monitoring a presence status of a client device associated with the user; and maintaining an on-line gaining session on behalf of the user even when the status indicates the client device is inactive.

4. The method as in claim 3 further comprising forwarding messages to the client device when the client device is active, wherein the messages were received when the client device was inactive.

5. The method as in claim 4 wherein the messages are forwarded wirelessly.

6. The method as in claim 3 further comprising collecting presence status information concerning the one or more third party users even when the client device is inactive.

7. The method as in claim 3 further comprising forwarding messages to the client device in order to update one or more indicators, wherein at least one of the indicators is associated with presence status information of the one or more third party users.

8. The method as in claim 1 further comprising: forwarding the request from the client device, to initiate an on-line gaining session, to a proxy agent; and receiving messages at the client device from the proxy agent during an active presence state, wherein the messages were originally received by the agent when the client device was inactive.

9. The method as in claim 8 further comprising exchanging signaling messages between the client device and the proxy agent using short binary messages.

10. The method as in claim 8 wherein the request is forwarded wirelessly from the client device to the proxy agent.

11. The method as in claim 8 further comprising receiving one or more messages from the agent at the client device, wherein at least one of the messages is used to update at least one indicator associated with presence status information of the one or more third party users.

12. A system for forming one or more groups associated with one or more online gaining sessions comprising:
- a memory storing instructions to implement a lobby, the lobby operable to receive one or more identities of one or more third party users;
- determine the availability of the identified third party users;
- compare profiles of the identified and available third party users, with attributes of a request to initiate an online gaining session of a game by a user, to determine the gaining skill level of the third party users;
- form a gaining group containing those third party users that are not currently involved in a gaining session of the game, and have the substantially same gaining skill level as that required by the request from the compared, identified and available users along with the user that initiated the request;
- initiate the online gaining session of the game for the formed gaining group;
- further comprising:
- forward requirements of the request on to a third party lobby to identify the third party users that satisfy the request; and
- receive an identification of each third party user that satisfies the request.

13. The system as in claim 12 wherein the memory comprises instructions further operable to:
- form the gaining group containing those third party users that are not currently involved in a gaining session of the game, and satisfy the request along with the user that initiated the request.

14. The system as in claim 12 further comprising: a proxy agent, the agent operable to monitor a presence status of a client device associated with the user; and maintain an on-line gaining session on behalf of the user even when the status indicates the client device is inactive.

15. The system as in claim 14, wherein the proxy agent is further operable to forward messages to the client device when the client device is active, wherein the messages were received when the client device was inactive.

16. The system as in claim 15, wherein the messages are forwarded wirelessly.

17. The system as in claim 14, wherein the proxy agent is further operable to collect presence status information concerning the one or more third party users even when the client device is inactive.

18. The system as in claim 14, wherein the proxy agent is further operable to forward messages to the client device in order to update one or more indicators, wherein at least one of the indicators is associated with presence status information of the one or more third party users.

19. The system as in claim 12 further comprising: a client device, the device operable to forward the request to a proxy agent; and
- receive messages from the proxy agent during an active presence state, wherein the messages were originally received by the agent when the client device was inactive.

20. The system as in claim 19, wherein the device is further operable to exchange signaling messages with the proxy agent using short binary messages.

21. The system as in claim 19, wherein the device is operable to forward the request wirelessly to the proxy agent.

22. The system as in claim 19, wherein the device is further operable to receive one or more messages from the agent, wherein at least one of the messages is used to update at least one indicator associated with presence status information of the one or more third party users.

* * * * *